Sept. 9, 1958 P. C. GOLDMARK 2,850,912
RECORD REVOLVING APPARATUS
Filed July 6, 1956
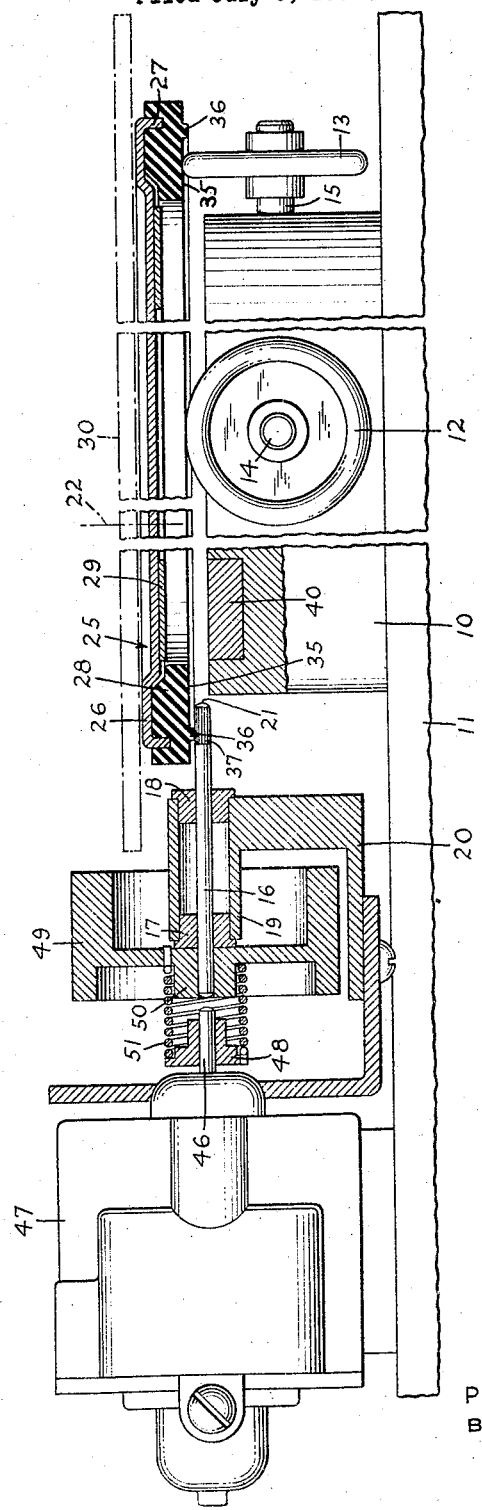
INVENTOR
PETER C. GOLDMARK
BY Campbell, Brumbaugh
Free and Gruss
HIS ATTORNEYS United States Patent Office 2,850,912
Patented Sept. 9, 1958

2,850,912
RECORD REVOLVING APPARATUS

Peter C. Goldmark, New York, N. Y., assignor to Columbia Broadcasting System, Inc., New York, N. Y., a corporation of New York Application July 6, 1956, Serial No. 596,205

8 Claims. (Cl. 74—206)

This invention relates generally to phonographic record players, and more particularly to record revolving apparatus for such record players.

The mentioned record revolving apparatus is ordinarily comprised of a turntable for the record, a drive motor providing mechanical power on an output shaft thereof, and an intermediate system of mechanical parts which transmit power from the output shaft of the motor to the turntable to cause rotation of the latter.

In the instance where the record player is to be used in an automobile or the like, it has been found desirable that the mentioned drive motor take the form of a governor-controlled D. C. motor, inasmuch as such type motor can be directly operated in a speed regulated manner from the D. C. current available from the battery of the automobile. Governor-controlled D. C. motors have a mode of operation wherein a number of wound poles of a rotor are successively carried past two or more permanently magnetized poles of a stator by the rotation of the rotor element. A commutator associated with the motor periodically switches the direction of D. C. current which flows through the windings of the rotor poles to cause successive reversals in the direction of magnetization of these poles. The reversals of D. C. current are so timed that each rotor pole, as it rotates beneath a given stator pole, is first magnetized to be attracted to the stator pole before reaching the same, and is then magnetized to be repelled from the stator pole after passing the same. A mechanically resonant governor is interposed in the D. C. energizing circuit for the rotor poles to cause rotation of the rotor in synchronism with the resonant frequency of the governor.

Previously-developed record players utilizing governor-controlled D. C. motors have not been entirely satisfactory for reasons which will now be considered.

As a first consideration, the power output of a motor is equal to the product of its torque and its angular speed. A constant value of power may be obtained for torque values distributed over a wide range of variation, provided that the value of angular speed used is inversely related to the value of torque used. Thus, it is possible to use either a high-torque, low-speed motor or a low-torque high-speed motor to provide a given amount of power.

If power were the only consideration entering into the design of a turntable drive, the selection of a suitable driving motor could be made from among a large number of motors which have different torque values, but which are comparable in respect to rated power. Where, however, the motor is of the governor-controlled, D. C. type, it has been found that among motors of comparable rated power, the motor of lowest torque and highest angular speed is the most satisfactory. This is so because such motors do not operate with constant torque, but are, instead, operated by intermittent torque impulses. As a result, the angular speed of the governor-controlled D. C. motor, while it is characterized (due to momentum), by a constant component of angular speed, is also characterized by a pulsating angular speed component or "ripple," derived from the intermittent torque impulses.

When a governor-controlled D. C. motor is operated at high torque and at a low speed (determined by the resonant frequency of the governor) the torque impulses of the motor are of high amplitude and low frequency to produce a corresponding low frequency ripple which is of high amplitude relative to the constant component of angular speed. When, on the other hand, the motor is operated at low torque and at high speed (corresponding to a high resonant frequency of the governor) to give the same power as before, the torque impulses are of low amplitude and high frequency to produce a high frequency ripple which is low in amplitude relative to the said constant component. In either case, the presence of the ripple is undesirable when the motor is used as a turntable driver, since the ripple, if reaching the turntable, will cause distortion in the sound being reproduced from a record on the turntable. Of the two types of ripple, however, the low-amplitude, high-frequency ripple is preferable by far to the other, inasmuch as a smaller amplitude of distortion will be produced thereby, and inasmuch as, beyond a certain frequency range, any distortion produced by motor ripple becomes less audible (due to the selective frequency response of the human ear) as the ripple frequency, and thus the distortion frequency is increased. Accordingly, it is desirable that a governor-controlled, D. C. motor providing power for a turntable be operated at as low a torque value and as high an angular speed value as is compatible with other design considerations.

In practice, a low-torque, high-speed governor-controlled D. C. motor can be used as a turntable drive by adopting the expedient of using a mechanical transmission between the motor and turntable which, through friction or toothed gears, or the like, effects a stepdown in angular speed, prior to communication of the motor power to the turntable, to thereby provide for rotation of the turntable at proper speed despite the high angular speed of the motor. For reasons of economy and efficiency, however, it has been found, according to the present invention, that it is preferable to use, instead of a transmission giving such intermediate step down, a transmission which is "direct" in the sense that the angular speed remains constant through the transmission from the output shaft of the motor to the end element of the transmission which causes rotation of the turntable. In other words, a "direct" mechanical transmission, as referred to herein, is a transmission characterized by a 1:1 angular speed ratio, throughout, from the input to the output of the transmission.

When such direct mechanical transmission is to be used, it is evident that the entire transformation between the high angular speed of the motor and the low angular speed of the turntable must be effected through the interaction of the end element of the transmission and the turntable. To permit the lowest practicable torque and highest practicable angular speed for the motor (to thereby minimize ripple), the angular speed ratio between this end element and the turntable should be such as to provide the greatest practicable stepdown in angular speed. Also, the back torque exerted by the turntable on the end element should be as low as is practicable.

As a second consideration, if a governor-controlled D. C. motor is to be used as a turntable driver, the ripple in the motor output cannot be completely eliminated merely by operating the motor at low torque and high speed. If, however, this ripple is not attenuated in the course of transmission of motor power to the turntable, the ripple will appear in the turntable motor to cause some distortion in sound reproduction as heretofore described.

It is, accordingly, an object of the invention to provide a mechanical coupling, between a turntable and the end element of a mechanical transmission means, which yields a large step down in angular speed from the end element to the turntable.

Another object of the invention is to provide mechanical transmission means for coupling the turntable and a drive motor whereby a pulsating or similarly undesirable component in the output of the motor may be substantially eliminated in the course of transmission of the motor output to the turntable.

Yet another object is to minimize the ripple component which is characteristic of a governor-controlled D. C. motor when such motor is utilized as a turntable drive motor.

These and other objects are realized by providing a turntable having an annular drive surface and by providing a shaft which contacts the drive surface to thereby be frictionally coupled with the turntable. The peripheral surface of the shaft over at least some portion of the axial extent thereof may be stoned or otherwise made rough to provide a good frictional driving surface. The shaft is adapted to be rotated by suitable drive means. When rotated, the shaft drives the undersurface of the turntable to cause the same to revolve. The described form of frictional drive provides the maximum step down between the angular speed of the shaft and the angular speed of the turntable.

Suitable means may be employed to maintain the shaft in firm contact with the drive surface of the turntable. This means may take the form, for example, of a permanent magnet whose field acts to draw the turntable towards the shaft.

As a feature according to the invention, the shaft may be coupled to the drive motor through mechanical filter means, which, in the course of transmission of the motor power to the shaft, attenuates or eliminates any ripple component which may be present in the motor output. This mechanical filter means may take the form, for example, of flywheel means or of torsion spring means, or of a combination of both these means.

For a better understanding of the invention, reference is made to the following description of an exemplary embodiment thereof, and to the single accompanying drawing representing a partially cross-sectioned, elevational view of the embodiment.

Referring to the figure, a block 10 of circular cross-section in the horizontal plane is mounted on a base 11. A pair of idler rolls 12, 13 are spaced at an interval of 120° around the outside of block 10 and are supported by stub shafts 14, 15 journalled into the cylindrical wall of block 10. A horizontal drive shaft 16 is rotatably mounted in bearings 17, 18 disposed within and at opposite ends of a bushing 19 which is supported above the base 11 by the vertical arm of an L-shaped plate 20 mounted from base 11. The drive shaft 16 is so disposed that the axis of the shaft is spaced at a 120° interval around block 10 from each of the idler rolls 12, 13.

The shaft 16 and the rolls 12, 13 form a three point support for a turntable formed of an aluminum disc 26. The disc 26 is characterized by a peripheral, downwardly extending flange 27 which is received into the body of an annular ring 28 of resilient material (as, say, rubber) to carry this ring in depending relation beneath the disc 26. Radially inward of the ring 28 and beneath the disc 26 there is attached to the disc 26 another disc 29 which is composed of magnetic material (as, say, magnetizable steel) and which has a purpose to be later described.

A record 30 is shown resting on the plate 26 of the turntable. The record 30 is maintained in centered relation on the turntable, and the turntable itself is maintained in centered relation relative to the block 10 by a spindle (not shown) which is fitted in block 10 to have the same axis 22 as the block, and which projects upward from block 10 to pass in somewhat loose-fitting relation through center holes (not shown) in the discs 29, 26 and in the record.

As is shown in the figure, the rubber ring 28 has an annular undersurface 35 which is flat for most of its radial extent but which is characterized in one part of its radial extent by a downwardly projecting ridge 36. The ridge 36 rests on the peripheral surface of the shaft 16, and the flat part of undersurface 35 rests on the idler rolls 12, 13 so that the turntable is floatingly supported by these three elements. The turntable 25 is revolved at standard speed by high speed rotation of shaft 16 which transmits power to the turntable through the frictional engagement of the shaft with the ridge 36. The ridge 36 is narrow in radial extent to minimize the slippage which will occur between the shaft and some portion of the radial extent of the ridge because of the difference in the tangential speed of the ridge at various points in its radial extent.

When a frictional drive of this sort is used it is desirable to maximize the friction between the two contacting surfaces to thereby minimize slippage. To this end, the portion of the peripheral surface 37 of shaft 16 which underlies the ridge 36 is made rough to increase the coefficient of friction thereof. Preferably, this roughening of this portion is effected by stoning the shaft, although knurling, splining, or the like may also be used.

It has been found desirable to provide some means which assures that firm frictional contact will be maintained at all times between the ridge 36 of ring 28 and the stoned peripheral surface of the shaft 16. As shown in the figure, this means may take the form of a permanent magnet 40 which is recessed in the upper surface of block 10 to lie radially inward of the end 21 of shaft 16 at a location where the magnet is beneath the rim portion of the magnetic disc 29. With the magnet 40 so located, the magnet will exert an attractive force on the plate 29 to cause the ridge 36 of ring 28 to be drawn down more firmly onto shaft 16 than would be the case if the ridge 36 rested on shaft 16 merely because of the weight of the turntable assembly.

A friction drive of the sort described, wherein the turntable is driven directly from the peripheral surface of the shaft (rather than from a friction wheel mounted on the shaft), permits the highest speed of rotation of the shaft consonant with attainment of a predetermined speed of revolution of the turntable as, say, 16⅔ R. P. M. Since the described friction drive permits and, in fact, requires high speed rotation of the shaft 16, it is possible to drive this shaft from a high speed, low torque, governor controlled D. C. motor by a mechanical transmission which is a direct transmission in the sense that it includes no elements for effecting a change in angular speed. The advantages in the use of such high-speed, low-torque, governor-controlled D. C. motor and of such direct mechanical transmission have been heretofore described.

In the present embodiment, the drive shaft 16 is coupled to the axially spaced and axially aligned output shaft 46 of a low-torque, high-speed, governor-controlled D. C. motor 47 by a mechanical transmission which includes a hub 48 on the shaft 46, a flywheel 49 mounted on shaft 16 and having a hub 50, and a torsion spring 51 having one end attached to and encircling the hub 48 and the other end attached to and encircling the hub 50 of the flywheel. A mechanical transmission of this sort is characterized by a 1:1 angular speed ratio between the output shaft 46 of the motor and the drive shaft 16, and this 1:1 transmission is a direct transmission in the sense described. In the transmission, the torsion spring 48 and the flywheel 49 act in combination as a mechanically resonant system having a resonant frequency considerably below that of any ripple component appearing in the output of the motor 47. Such mechanically resonant system operates as a mechanical filter to attenuate or eliminate the ripple component in the course of transmission of power from the motor 47 to the turntable. Accordingly, the turntable motion will be substantially free of any ripple component to thereby permit distortion-free reproduction of sound from the record 30 being revolved by the turntable.

The above-described embodiment being exemplary only, it will be evident that the present invention comprehends embodiments differing in form or detail from the described embodiment. For example, while the idler rolls 12, 13 and the spindle may be supported by a block 10, and the block 10 and other elements be supported by a base 11, all as described above, these particular structural relations have been specified herein to simplify the disclosure of the support system. In fact, the support system disclosed herein represents a workable modified version of a support system which is conveniently used in practice, and which is disclosed in my copending U. S. application, Serial No. 533,615, filed September 12, 1955 of which this application is a continuation-in-part. Accordingly, the invention is not to be considered as limited save as is consonant with the scope of the following claims.

I claim:

1. Record revolving apparatus for a phonographic record player comprising, a horizontal turntable, an annular ring member carried by said turntable on the under side thereof and having an annular friction surface, anti-friction means supporting said turntable from beneath to provide two points of a three point support for said turntable permitting rotation thereof, a horizontal drive shaft extending beneath said turntable radially inward of the rim thereof and having a rough peripheral friction surface for at least a portion of the shaft extent, said peripheral surface being in contact with said annular surface to provide the third point of said three point support and to form a frictional coupling between said turntable and shaft whereby said turntable is revolvable by rotation of said shaft.

2. Record revolving apparatus for a phonographic record player comprising, a horizontal turntable, an annular ring member carried by said turntable on the under side thereof and having an annular friction surface, anti-friction means supporting said turntable from beneath to provide two points of a three point support for said turntable permitting rotation thereof, a horizontal drive shaft extending beneath said turntable radially inward of the rim thereof and having a peripheral friction surface for at least a portion of the shaft extent, said peripheral surface being in contact with said annular surface to provide the third point of said three point support and to form a friction coupling between said turntable and shaft whereby said turntable is revolvable by rotation of said shaft, and means for providing a force ancillary to gravity to maintain said peripheral surface and said annular drive surface in frictional contact.

3. Record revolving apparatus for a phonographic record player comprising, a horizontal turntable, an annular ring member carried by said turntable on the under side thereof and having an annular friction surface, anti-friction means supporting said turntable from beneath to provide two points of a three point support for said turntable permitting rotation thereof, a horizontal drive shaft extending beneath said turntable radially inward of the rim thereof and having a rough peripheral surface for at least a portion of the shaft extent, said peripheral surface being in contact with said annular surface to provide the third point of said three point support and to form a frictional coupling between said turntable and shaft whereby said turntable is revolvable by rotation of said shaft, a disc of magnetizable material carried by said turntable, and a magnet disposed beneath said disc and adapted by attracting said disc to draw said turntable towards said shaft to thereby increase the contact force between said shaft peripheral surface and said annular drive surface.

4. Record revolving apparatus for a phonographic record player comprising, a horizontal turntable, an annular ring member carried by said turntable on the under side thereof and having an annular friction surface, anti-friction means supporting said turntable from beneath to provide two points of a three point support for said turntable permitting rotation thereof, a horizontal drive shaft extending beneath said turntable radially inward of the rim thereof and having a peripheral friction surface for at least a portion of the shaft extent, said peripheral surface being in contact with said annular surface to provide the third point of said three point support and to form a friction coupling between said turntable and shaft whereby said turntable is revolvable by rotation of said shaft, a disc of magnetizable material carried by said turntable, a magnet disposed beneath said disc and adapted by attracting said disc to draw said turntable towards said shaft to thereby increase the contact force between said shaft peripheral surface and said annular drive surface, and mechanical transmission means adapted to couple said drive shaft to the output shaft of a drive motor with a 1:1 angular speed ratio between said drive shaft and said output shaft.

5. Record revolving apparatus for a phonographic record player comprising, a horizontal turntable, an annular ring member carried by said turntable on the under side thereof and having an annular friction surface, anti-friction means supporting said turntable from beneath to provide two points of a three point support for said turntable permitting rotation thereof, a horizontal drive shaft extending beneath said turntable radially inward of the rim thereof and having a rough peripheral surface for at least a portion of the shaft extent, said peripheral surface being in contact with said annular surface to provide the third point of said three point support and to form a friction coupling between said turntable and shaft whereby said turntable is revolvable by rotation of said shaft, and mechanical transmission means adapted to couple said drive shaft to the output shaft of a drive motor with a 1:1 angular speed ratio between said drive shaft and said output shaft.

6. Record revolving apparatus for a phonographic record player comprising, a horizontal turntable, an annular ring member carried by said turntable on the under side thereof and having an annular friction surface, anti-friction means supporting said turntable from beneath to provide two points of a three point support for said turntable permitting rotation thereof, a horizontal drive shaft extending beneath said turntable radially inward of the rim thereof and having a rough peripheral surface for at least a portion of the shaft extent, said peripheral surface being in contact with said annular surface to provide the third point of said three point support and to form a frictional coupling of said turntable and shaft whereby said turntable is revolvable by rotation of said shaft, flywheel means on said drive shaft, a shaft axially spaced from said drive shaft in axial alignment therewith and adapted to receive power from a motor, and torsion spring means coupling said two shafts together.

7. Record revolving apparatus for a phonographic record player comprising, a horizontal turntable, an annular ring member carried by said turntable on the under side thereof and having an annular friction surface, anti-friction means supporting said turntable from beneath to provide two points of a three point support for said turntable permitting rotation thereof, a horizontal drive shaft extending beneath said turntable radially inward of the rim thereof and having a rough peripheral surface for at least a portion of the shaft extent, said peripheral surface being in contact with said annular surface to provide the third point of said three point support and to form a frictional coupling of said turntable and shaft whereby said turntable is revolvable by rotation of said shaft, a disc of magnetizable material carried by said turntable, a magnet disposed beneath said disc and adapted by attracting said disc to draw said turntable towards said shaft to thereby increase the contact force between said shaft peripheral surface and said annular drive surface, flywheel means on said drive shaft, a shaft axially spaced from said drive shaft in axial alignment therewith and adatped to receive power from a motor, and torsion spring means coupling said two shafts together.

8. Record revolving apparatus for a phonographic record player, said apparatus comprising, a horizontal turntable, an annular body of material carried by said turntable on the under side thereof and providing a downward-facing annular friction surface, anti-friction means supporting said turntable from beneath to provide two points of a three point support for said turntable permitting rotation thereof, and drive means rotatable about a central horizontal axis extending beneath said turntable radially of the rim thereof and characterized by at least a portion thereof which is of circular cross section normal to said axis, said portion being disposed beneath said annular friction surface and having a peripheral surface in friction contact with said annular surface to provide the third point of said three point support and to form a frictional coupling between said turntable and drive means whereby said turntable is revolvable by rotation of said drive means, said portion of said drive means being constituted of material which is hard relative to the material of said annular body whereby the wear induced by the friction contact of said annular surface and peripheral surface is manifested substantially entirely by said annular surface.

References Cited in the file of this patent

UNITED STATES PATENTS

| | | |
|---|---|---|
| 1,271,590 | Lefever | July 9, 1918 |
| 2,647,408 | Manning | Aug. 4, 1953 |